United States Patent Office 3,208,098
Patented Sept. 28, 1965

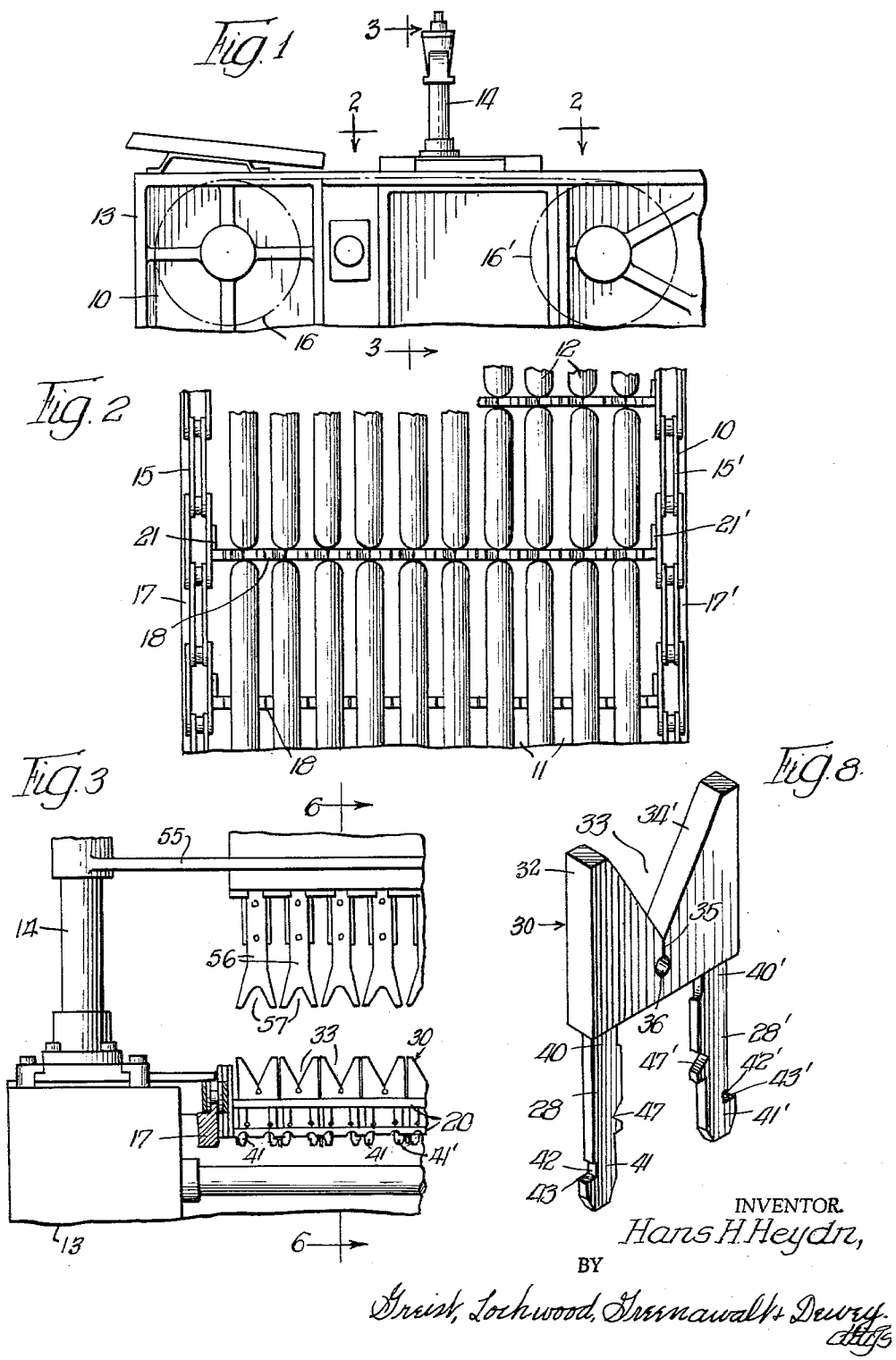

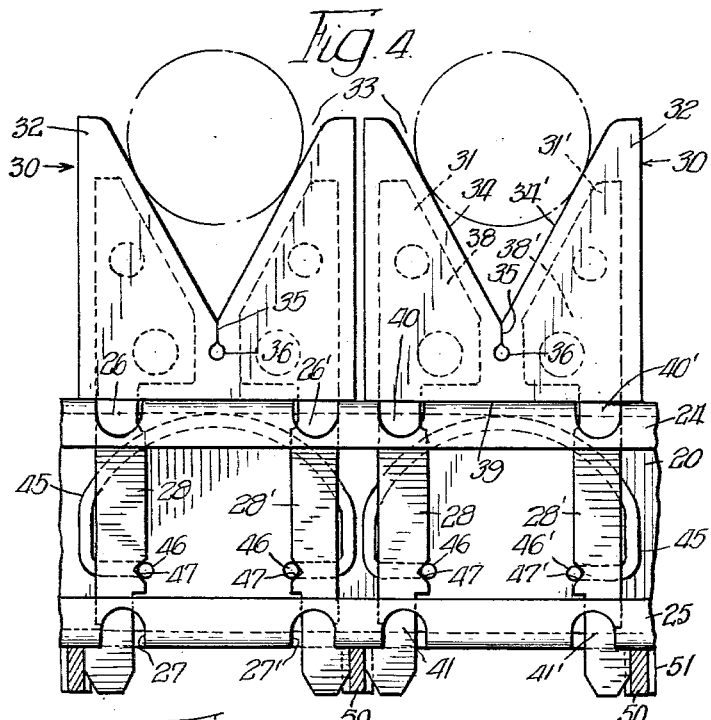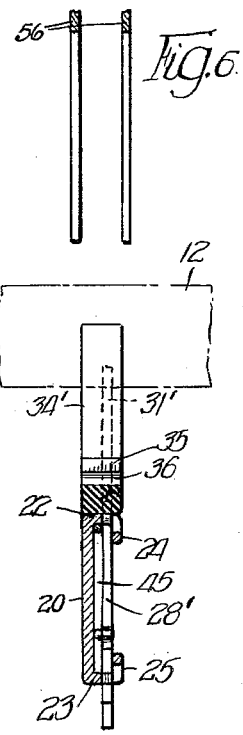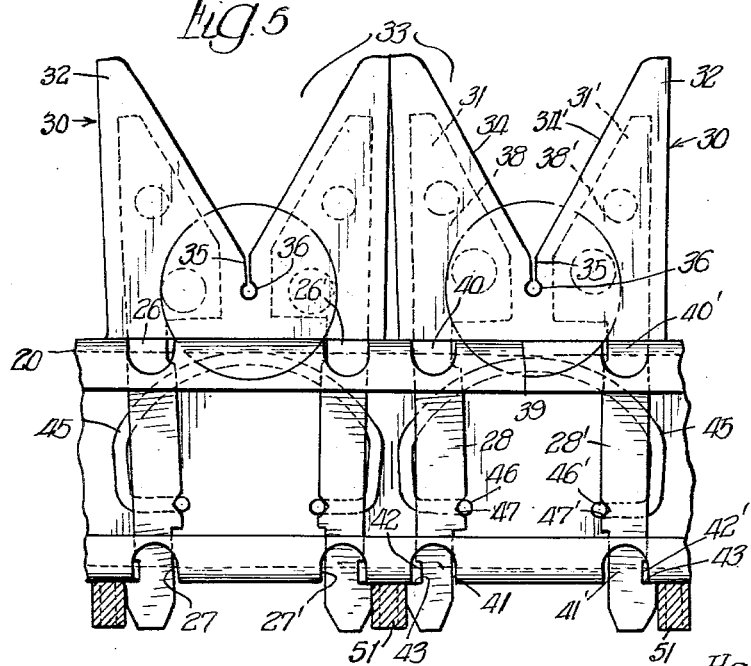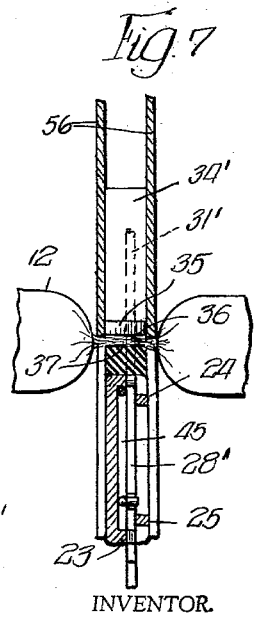
INVENTOR.
Hans H. Heydn

3,208,098
SAUSAGE LINKING APPARATUS
Hans H. Heydn, Madison, Wis., assignor to Oscar Mayer & Co., Inc., Chicago, Ill., a corporation of Illinois
Filed Feb. 17, 1964, Ser. No. 345,144
6 Claims. (Cl. 17—34)

This invention relates to the manufacture of sausages and is more particularly concerned with apparatus for dividing relatively long lengths of filled or stuffed casings into links by constricting the casing at intervals corresponding to the desired length of sausages and thereafter retaining the same in connected link forming arrangement while the links are advanced through processing apparatus where they are cooked, smoked or otherwise prepared for marketing.

It is a general object of the invention to provide an improved apparatus for dividing stuffed sausage casings into link forming lengths which may be adapted for incorporation in a sausage linking and processing machine of the type disclosed in co-pending application Serial No. 185,167, filed April 4, 1962, now Patent No. 3,166,784, dated January 26, 1965, and in Patent No. 3,059,272, dated October 23, 1962.

It is a more specific object of the invention to provide sausage link forming and conveying apparatus which includes a traveling conveyor on which a plurality of lengths of stuffed casings are divided into link forming sections and thereafter advanced to processing chambers, and a linking bar assembly for the conveyor which has a plurality of individual casing constricting and holding devices mounted thereon so that the devices are readily removable and replaceable in the event an individual device is damaged or fails to properly function, thereby enabling the device to be removed from the conveyor without any need for disassembly of the conveyor or removal of the entire linking bar.

It is a still further object of the invention to provide a sausage linking machine having a link supporting and carrying conveyor provided with a series of longitudinally spaced cross bars each of which has mounted thereon a plurality of casing constricting devices which are aligned longitudinally of the conveyor to permit multiple lines of casings to be divided into sausage forming links, which are mounted on the cross bars so that they may be readily removed and replaced without removing or altering the cross bars and which are effective to constrict the casings at intervals and thereafter to hold the constricted casing sections against removal therefrom while they are carried through processing chambers.

It is another object of the invention to provide a sausage linking apparatus of the character described which includes cam members for opening the individual link forming devices at predetermined points to facilitate removal therefrom of the connected links.

These and other objects and advantages of the invention will be apparent from a consideration of the apparatus which is shown by way of illustration in the accompanying drawings wherein:

FIGURE 1 is a side elevation of a portion of a sausage linking and conveying apparatus which embodies the principal features of the invention, the apparatus being shown in part diagrammatically;

FIGURE 2 is a transverse view taken generally on line 2—2 of FIGURE 1, to an enlarged scale, and with portions omitted, the view showing the sausage linking and carrying conveyor;

FIGURE 3 is a partial cross section taken generally on the line 3—3 of FIGURE 1, to a larger scale and with portions broken away, the view illustrating one of the link forming bar assemblies and associated mechanism;

FIGURE 4 is a fragmentary elevational view, to a larger scale, showing a portion of one of the cross bar assemblies;

FIGURE 5 is a fragmentary elevational view similar to FIGURE 4 with the members in a different position;

FIGURE 6 is a cross section taken generally on the line 6—6 of FIGURE 3, to an enlarged scale;

FIGURE 7 is a fragmentary cross section similar to FIGURE 6 with the members in a different position; and FIGURE 8 is a perspective view of one of the casing constricting devices removed from the supporting cross bar.

Referring to FIGURES 1 to 3 of the drawings, there is illustrated a portion of a continuously traveling endless chain conveyor 10 which forms the link receiving and supporting conveyor for an apparatus which is adapted to divide a plurality of lengths of stuffed sausage casings 11 into link forming sections 12 and thereafter advance the links through processing apparatus in a continuous operation. The conveyor 10 is suitable for use as a linking conveyor in the forming and processing apparatus illustrated in co-pending application Serial No. 185,167, filed April 4, 1962 which may be referred to for details of the apparatus not hereinafter described.

The conveyor 10 has a horizontally disposed upper run or stretch at one end of the apparatus which is supported on an upright frame 13, the latter also supporting a vertically extending frame 14 above the upper run of the conveyor 10 on which there is mounted for vertical reciprocation a plurality of devices which co-operate with casing constricting and gathering devices on the conveyor 10 for dividing each of the plurality of lengths of stuffed sausage casings 11 which are fed thereto in parallel, laterally spaced relation, into a connected series of link forming sections 12, the latter being held on the conveyor 10 and subsequently carried through processing chambers or compartments by advancing movement of the conveyor 10.

The conveyor 10 on which the sausage links 12 are formed and carried comprises a pair of endless chains 15 and 15' (FIGURE 2) which are arranged in transversely spaced, parallel relation and supported on suitable sprockets spaced throughout the processing machine, two of the sprockets being indicated at 16 and 16' in FIGURE 1. Chains 15 and 15' are supported on guide rails 17 and 17' on the sides of the support frame 13 at the linking station where the upper run of the conveyor 10 travels in a horizontal path. A plurality of cross bar assemblies 18 are carried between the chains 15 and 15' in longitudinally spaced relation with the spacing between the assemblies 18 corresponding to the length desired for the links 12. Each of the link forming cross bar assemblies 18 comprises a single plate-like support bar 20 (FIGURES 3 to 7) which is attached at its opposite ends to the chains 15 and 15' by bracket forming angle members 21 and 21'. The support bars 20 are arranged in transversely extending, parallel relation on the chains 15 and 15' and are spaced longitudinally according to the size desired for the links 12.

Each of the support bars 20 (FIGURES 4 to 7) is preferably formed of metal plate with top and bottom marginal portions bent or folded so as to provide a rectangular cross section with an open side along the length thereof and with end portions bent to form attaching brackets 21 and 21' for securing the bar to the chains 15 and 15'. The top and bottom walls 22 and 23 of the bar 20 and the relatively narrow flange-like adjoining side wall sections 24 and 25 are provided with spaced pairs of slots 26, 26' and 27, 27' which are of generally rectangular configuration in the top and bottom walls 22 and 23 and semi-circular configuration in the side wall portions 24 and 25. The slots or holes 26, 27 and 26', 27' are vertically aligned and each set of holes or slots 26, 27 and 26', 27' is adapted to accommodate spaced supporting leg or stem members 28 and 28' for attaching thereto and retaining on the bar 20 a casing constricting device 30 from the bottom edge of which the supporting or attaching legs 28 and 28' extend.

Each of the casing constricting devices 30 (FIGURES 4 to 8) comprises a pair of spaced metal plates 31 and 31' having corresponding end portions encased in a generally rectangular block or plate-like member 32 which is formed of rubber or similar material having substantial elasticity. The block or plate 32 has a thickness corresponding approximately to the width of the top edge or wall 22 of the cross bar 20 and is shaped to provide an inwardly or downwardly extending V slot 33 defined by inwardly converging wall or edge formation 34 and 34' which terminate at the outer end of a vertically extending slit 35. The converging wall formations 34 and 34' are of relatively narrow width, as shown, being approximately the same as the width of the cross bar top edge 22, the width being sufficient, however, to avoid cutting the casing when it is forced downwardly between the same. The slit 35 is relatively short and provides a restricted entrance to a cylindrical recess or pocket 36 in which a gathered portion 37 (FIGURE 7) of the casing is adapted to be received and held after it is forced downwardly in the V-shaped slot 33 and through the slit 35.

The two plates 31 and 31' are identical and positioned so as to form rights and lefts. They have generally triangular shaped ends 38 and 38' which are encased in the block member 32 with relatively straight leg or stem forming portions or members 28 and 28' extending in generally parallel relation from the bottom edge or face 39.

The leg forming portions 28 and 28' of the plates 31 and 31' are reduced in width at 40 and 40' so as to be received in the notches 26 and 26' in the top of the bar 20 with a small amount of play or freedom of movement in the plane of the bar 20. The end portions 41 and 41' of the leg members 28 and 28' are also reduced in width and notched at 42 and 42' so as to be received in the slots or openings 27 and 27' in the bottom of the bar 20 with a certain amount of play or freedom of movement in the plane of the bar 20 and with the shoulders 43 and 43' resulting from the notches 42 and 42' normally abutting the outside face of the bottom wall 23 and locking the plates against withdrawal from the bar 20. The leg members 28 and 28' are normally urged in a direction away from each other by a C-shaped spring member 45 which has free end portions 46 and 46' bent at right angles to the body portion and seated in V-shaped notches 47 and 47' in the leg members 28 and 28'. The bowed center of the spring 45 abuts against the inside face of the top wall 22 of the cross bar 20 while the end portions 46 and 46' engage the opposed edges of the leg members 28 and 28' and urge the same away from each other so as to normally hold the slit 35 in closed condition as shown in FIGURE 4. Cam bars 50 having widened portions 51 are arranged in parallel relation beneath the conveyor 10 for engaging vertically extending side portions of the terminal end sections 41 and 41' of the leg members 28 and 28' so as to move the latter toward each other (FIGURE 5) and urge the upper portions of the block 32 away from each other thereby opening the slot 35 so as to facilitate insertion and removal of the casing when it is initially constricted and forced into the pocket 35 and when it is removed therefrom at a subsequent point in the processing operation.

The casing constricting and holding devices 30 are individually removable from the cross bar 20 upon forcing the leg members 28 and 28' toward each other a sufficient distance to permit the end portions 41 and 41' to pass through the slots 27 and 27' and the slots 26 and 26', the spring 45 being removed in the process of withdrawing the leg members through the slots in the cross bar.

In using the apparatus, the lengths of stuffed casing 11 are fed so that they are laid in the V-shaped slots 33 defined by the edge surfaces 34 and 34' of the casing constricting devices 30 on the cross bar assemblies and the cross bar assemblies 18 are advanced by movement of the conveyor 10 to the linking station (FIGURE 1) where they are disposed beneath the vertically reciprocating cross bar 55 (FIGURE 3) on the frame 14. The cross bar 55 has a plurality of transversely spaced pairs of depending plates 56 which have downwardly opening V-shaped slots 57 in their lower ends. The slots 57 in each pair of plates 56 are aligned in the longitudinal direction of the conveyor 10 and each pair of plates 56 is positioned on the cross bar 55 to place the slots 56 in alignment with a slot 33 in a device 30 as the latter is brought into vertical alignment or register beneath the cross bar 55 (FIGURE 6). The cross bar 55 is reciprocated vertically by a suitable mechanism (not shown) in timed relation to the movement of the cross bar assemblies on the conveyor 10 so as to move the neck forming plates 56 into straddling relation with the casing constricting devices 30 on each successive cross bar assembly 18. The bar 55 is moved downwardly a sufficient distance to force the stuffed casings 11 down through the slits 35 and into the pockets 36 where the constricted portions of the casings are held while the necking plates 56 are raised and the conveyor advances the links beyond the linking station and through the processing chambers.

While specific materials and particular details of construction have been referred to in describing the illustrated form of the apparatus, it will be understood that other materials and equivalent structural details may be resorted to within the spirit of the invention.

I claim:

1. In a machine for linking stuffed sausage casing, a traveling conveyor having cross bar assemblies which are spaced a distance apart corresponding to the length of link desired, said cross bar assemblies each comprising a supporting cross bar member having individual casing constricting and holding members mounted in spaced, side-by-side relation thereon, each of said casing constricting and holding members being characterized by a rectangular plate member of molded rubber or like material which is constructed so as to provide, when mounted on said supporting cross bar member, an outwardly opening, V-shaped slot defined by inwardly converging tapered edges which terminate at a small slit extending to a neck-retaining cylindrical pocket of relatively small size whereby a stuffed casing may be forced into the slot and through the slit so as to constrict the casing and position the neck thus formed in the pocket, said casing constricting and holding member having leg forming members extending in generally parallel relation from the opposite edge and in a direction opposite the V-shaped slot, and said supporting cross bar member having a generally rectangular cross section with pairs of aligned slots in the opposite edges for receiving said leg members, said leg members having end portions encased in said plate member, spring means for urging the extending portions of said leg members apart and cam members for moving the extending portions of said leg members toward each other.

2. In a machine for linking stuffed sausage casing, a traveling conveyor having cross bar assemblies which are spaced a distance apart corresponding to the length of link desired, said cross bar assemblies each comprising a supporting cross bar member having individual casing constricting and holding devices mounted in spaced relation along the same, each of said casing constricting and holding devices comprising a plate-like member formed of molded rubber or like material and constructed so as to provide, when mounted on the outermost edge of said supporting cross bar member, an outwardly opening, V-shaped slot defined by inwardly converging, relatively narrow tapered edge surfaces which terminate at a small slit extending transversely of said plate-like member to a transversely extending, neck-retaining pocket of relatively small, generally cylindrical cross section whereby a stuffed casing may be forced into the slot and through the slit so as to constrict the casing and position the neck thus formed in the pocket, said casing constricting and holding devices each having a pair of leg forming plate members of rigid material which are encased at one end in said slot forming plate member and which have portions at their other ends extending from the opposite edge and in a direction opposite the V-shaped slot, said supporting cross bar member being formed of rigid plate-like material bent so as to form a hollow tube with a rectangular cross section and having spaced along its narrow inner and outer edges pairs of apertures which are aligned transversely of the cross bar member and receive the leg forming plate members, spring means urging the non-encased ends of said leg forming plate members apart whereby said casing constricting and holding devices are retained in frictionally locked relation on said supporting cross bar member.

3. In a machine for linking stuffed sausage casing, a traveling conveyor having cross bar assemblies which are spaced a distance apart corresponding to the length of link desired, said cross bar assemblies each comprising a supporting cross bar member having individual casing constricting and holding devices removably mounted in spaced relation thereon so as to extend from the outer margin thereof, each of said casing constricting and holding devices including a block member formed of molded rubber or like material which is generally rectangular shaped and constructed so as to provide, when mounted in the plane of said supporting cross bar member and on the outermost edge thereof, an outwardly opening, V-shaped slot defined by inwardly converging narrow tapered edge surfaces which terminate at a small slit extending to a neck-retaining cylindrical pocket of relatively small cross section, said slit and said neck-retaining pocket extending between lateral faces of said block member whereby a stuffed casing may be forced into the V-shaped slot and through the slit so as to constrict the casing and position the neck thus formed in the pocket, said block member encasing laterally spaced end portions of a pair of leg forming narrow plate members of rigid material, said pair of plate members having the encased end portions extending along opposite sides of said V-shaped slot and having free end portions projecting in generally parallel, spaced relation from an edge of said block member in a direction opposite the V-shaped slot, said supporting cross bar member having pairs of apertures spaced along its inner and outer margins which are aligned transversely of said cross bar member and which receive the free end portions of said plate members, resilient means for urging said free end portions into locking engagement with edges of said bar member adjacent said apertures, and cam means for moving said free end portions so as to pivot the encased end portions apart and thereby open said slit.

4. In a machine for linking stuffed sausage casing, a traveling conveyor having cross bar assemblies which are spaced apart longitudinally of the conveyor a distance corresponding to the length of link desired, said cross bar assemblies each comprising a plate-like hollow supporting bar member of generally rectangular cross section having a plurality of individual casing constricting and neck retaining devices mounted in side-by-side relation along an outermost edge thereof, each of said casing constricting and neck retaining devices being in the form of a rectangular plate-like member of molded rubber-like material constructed with a V-shaped slot opening outwardly of the one edge and a pair of supporting leg members having end portions encased in marginal portions of said plate-like member on opposite sides of said V-shaped slot and having the opposite end portions extending in parallel relation from the edge opposite the V-shaped slot, said V-shaped slot being defined by a pair of inwardly converging, relatively narrow edge surfaces which extend to a relatively short entrance slit leading into a neck retaining pocket of generally cylindrical shape and relatively small diameter, said supporting bar member having pairs of small apertures aligned laterally thereof and spaced along its outer and inner edges which receive said leg members, means to normally hold said leg members in said apertures so that said slit in each of said devices is closed and constricts the casing when it is forced down into the V-shaped slot and through the slit, and means to move said leg members relative to each other so as to open said slit and facilitate removal of the constricted casing from said pocket and out of said V-shaped slot.

5. In a machine as recited in claim 4, and said leg members having notches adapted to receive edge portions of said cross bar member adjacent said apertures in the normal position of said leg members so as to lock the casing constricting and neck retaining devices on said cross bar member.

6. In a machine as recited in claim 4, and the means to move said leg members relative to each other comprising elongate cam bars mounted adjacent said conveyor so as to engage end portions of said leg members which project from the innermost edge of said supporting bar member.

References Cited by the Examiner

UNITED STATES PATENTS 3,042,963 7/62 Runge _____ 17—34
3,059,272 10/62 Millenaar _____ 17—34

SAMUEL KOREN, *Primary Examiner.*

LUCIE H. LAUDENSLAGER, *Examiner.*